United States Patent
Briggs et al.

(10) Patent No.: US 10,474,675 B2
(45) Date of Patent: *Nov. 12, 2019

(54) EXPLAIN TOOL FOR OPTIMIZING SPARQL QUERIES

(71) Applicant: International Business Machines Corporation, Armonk, NY (US)

(72) Inventors: Mario D. Briggs, Bangalore (IN); Priya R. Sahoo, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 471 days.

This patent is subject to a terminal disclaimer.

(21) Appl. No.: 15/072,377

(22) Filed: Mar. 17, 2016

(65) Prior Publication Data

US 2016/0267134 A1    Sep. 15, 2016

Related U.S. Application Data

(63) Continuation of application No. 14/645,767, filed on Mar. 12, 2015.

(51) Int. Cl.
   *G06F 16/2453* (2019.01)
(52) U.S. Cl.
   CPC .............. *G06F 16/24542* (2019.01)
(58) Field of Classification Search
   USPC ........................................ 707/718
   See application file for complete search history.

(56) References Cited

U.S. PATENT DOCUMENTS

| | | | |
|---|---|---|---|
| 7,818,352 B2 | 10/2010 | Krishnamoorthy et al. | |
| 8,275,784 B2 | 9/2012 | Cao et al. | |
| 8,868,546 B2 * | 10/2014 | Beerbower | G06F 17/30545 |
| | | | 707/718 |
| 2009/0013319 A1 | 1/2009 | Williams et al. | |
| 2010/0250577 A1 | 9/2010 | Cao et al. | |
| 2011/0282847 A1 * | 11/2011 | Collins | G06F 16/2455 |
| | | | 707/688 |
| 2014/0067793 A1 | 3/2014 | Shironoshita | |
| 2014/0156633 A1 | 6/2014 | Duan et al. | |
| 2014/0279837 A1 * | 9/2014 | Guo | G06F 16/282 |
| | | | 707/603 |
| 2015/0120643 A1 | 4/2015 | Dantressangle | |

OTHER PUBLICATIONS

IBM Appendix P, list of patents and patent applications treated as related, Mar. 17, 2016, 2 pages.

(Continued)

*Primary Examiner* — Cheyne D Ly
(74) *Attorney, Agent, or Firm* — Maeve M. Carpenter

(57) ABSTRACT

As disclosed herein a method, executed by a computer, for enabling a SPARQL explain tool that provides query execution statistics via an explain plan includes initiating a database query comprising a SPARQL query pattern, optimizing the database query according to query semantics and database metadata to produce an optimized query, and generating an explain plan for the optimized query. The explain plan may include a sequence of operations and an execution time, an input, and an output for each operation of the sequence of operations. A computer system, and a computer program product corresponding to the method are also disclosed herein.

5 Claims, 5 Drawing Sheets

(56) References Cited

OTHER PUBLICATIONS

Hu et al., "Supporting Time-Constrained SQL Queries in Oracle", VLDB '07, Sep. 23-28, 2007, pp. 1207-1218.
Buil-Aranda et al., "Semantics and Optimization n The SPARQL 1.1 Federation Extension", G. Antoniou et al. (Eds.), ESWC 2011, Part II, LNCS 6655, pp. 1-5, 2011.
IBM, "A System and Method for Efficient RDF Query Processing", An IP.com Prior Art Database Technical Disclosure, Mar. 16, 2009, IP.com No. 000180721, pp. 1-5.
"Interpreting Explain Plan", noted in Search Report dated Oct. 16, 2014, pp. 1-16, <http://www.akadia.com/services/pra_interpreting_explain_plan.html>.
"Runtime Query Optimization", bigdata® Runtime Query Optimizer, SYSTAP™ © 2006-2014, pp. 1-39, <http://www.bigdata.com/blog>.
"Viewing query explain plans", noted in Search Report data Oct. 16, 2014, pp. 1-3, © 2013-2014 SPARQL City Inc., <http://sparqlcity.com/documentation/Content/Viewing_explain_plans.htm>.
"How can I get a full explain plan for a simple SPARQL query?", Virtuoso Open-Source Wiki, noted in Main Idea dated Mar. 21, 2014, pp. 1-2, Copyright (C) 2009 OpenLink Software, <http://virtuoso.openlinksw.com/dataspace/doc/dav/wiki/Main/VirtTipsAndTricksAnalyzingSPARQLQuery>.
Briggs et al., "Explain Tool for Optimizing SPARQL Queries", U.S. Appl. No. 14/645,767, filed Mar. 12, 2015, 29 pages.
Libkin et al., "TriAL for RDF: Adapting Graph Query Languages for RDF Data", PODS'13, Jun. 22-27, 2013, New York, New York, USA, pp. 201-212.
Stocker et al., "SPARQL Basic Graph Pattern Optimization Using Selectivity Estimation", WWW 2008, Refereed Track: Semantic / Data Web—Semantic Webb II, Apr. 21-25, 2008, Beijing, China, pp. 595-604.

\* cited by examiner

EXPLAIN TOOL FOR OPTIMIZING SPARQL QUERIES

BACKGROUND OF THE INVENTION

The present invention relates generally to the field of data retrieval, and more particularly to optimizing SPARQL query execution.

Resource description framework (RDF) Triplestores are a schema-free database. SPARQL is a query language used with triplestore databases. The data in a triplestore database is defined in a de-normalized form (i.e., subject, predicate <attribute-name> and object <attribute-value>), which represents a triple. A triplestore is analogous to an individual row in a relational data model. Traversal of the triplestore databases, also known as linking, allows a user to issue a query against a triplestore database that can link data to any individual attribute.

SUMMARY

As disclosed herein a method, executed by a computer, for enabling a SPARQL explain tool that provides query execution statistics via an explain plan includes initiating a database query comprising a SPARQL query pattern, optimizing the database query according to query semantics and database metadata to produce an optimized query, and generating an explain plan for the optimized query. The explain plan may include a sequence of operations and an execution time, an input, and an output for each operation of the sequence of operations. A computer system, and a computer program product corresponding to the method are also disclosed herein.

DETAILED DESCRIPTION

The SPARQL database query language uses triples (i.e., subject, predicate, object) to query data from a schema-free database. Many times a user will not be aware of the cardinality (i.e., the uniqueness of values) corresponding to each of the nodes being linked by a SPARQL query, and a result set corresponding to an intermediate query may be very large, negatively affecting performance of the query. When bi-directional relationships exists and both triples are stated in the system (e.g., A contains B and B is Contained By A), it may not be evident, even to a knowledgeable user, what the cardinalities would be. It has been observed that these cardinality problems in RDF triplestore databases commonly cause queries to perform poorly, possibly never complete, and may even 'hang' a computer system. The embodiments disclosed herein provide a method for enabling the generation of an explain tool output for optimizing SPARQL queries.

Figure 1:
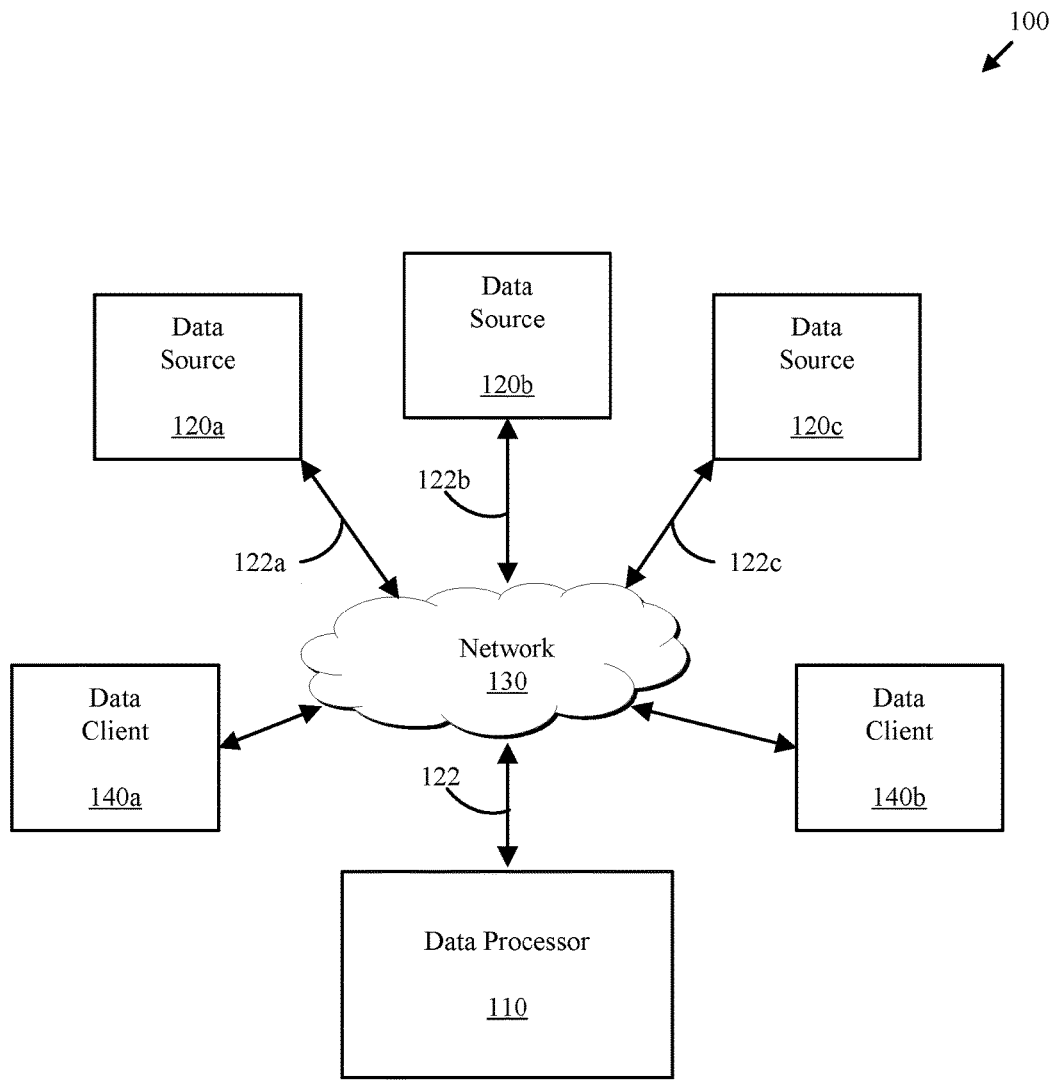
FIG. 1 is a functional block diagram of one embodiment of a distributed data processing environment in which at least some of the embodiments disclosed herein may be deployed.

FIG. 1 is a functional block diagram of one embodiment of distributed data processing environment 100. As depicted, distributed data processing environment 100 includes data processor 110, one or more data sources 120 (e.g., data sources 120a, 120b, and 120c), network 130, and one or more data clients 140 (e.g., data clients 140a and 140b). Distributed data processing environment 100 is one example of an environment in which at least some of the embodiments disclosed herein may be deployed.

Data processor 110 processes data provided by, or retrieved from, the data sources 120. Data sources 120 may be accessible to data processor 110 via network 130. One or more data clients 140 may also be connected to data processor 110 via network 130. In some embodiments data sources 120 are also data clients 140.

Data 122, provided by data sources 120, may be data stored in a database residing on data source 120. The database may be a RDF Triplestore database and the data may be represented in the database by triples. Query execution may require that data 122 be retrieved from one or more databases. For example, the data records that comprise data 122 (e.g. data 122a, 122b and 122c) may have been retrieved from separate databases using various SPARQL query patterns.

Figure 5:
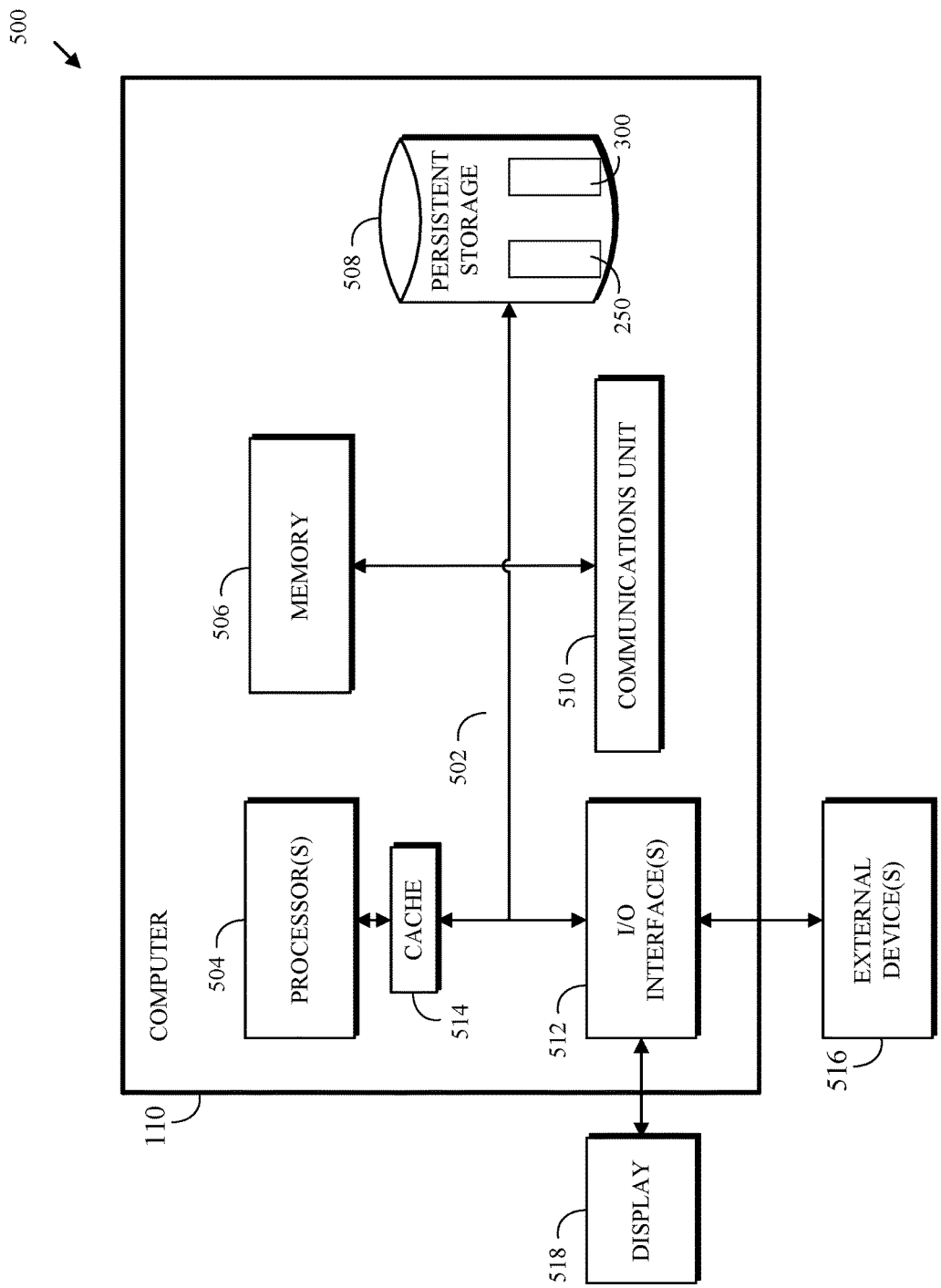
FIG. 5 is a block diagram depicting various components of one embodiment of a computer suitable for executing the methods disclosed herein.

It should be noted that data processor 110 may include internal and external hardware components, as depicted and described in further detail with respect to FIG. 5. Furthermore, network 130 can be any combination of connections and protocols that will support communications between data processor 110, data sources 120, data clients (i.e., data consumers) 140, and other computing devices (not shown) within distributed data processing environment 100. For example, network 130 can be a local area network (LAN), a wide area network (WAN) such as the Internet, or a combination of the two, and can include wired, wireless, or fiber optic connections.

Figure 2:
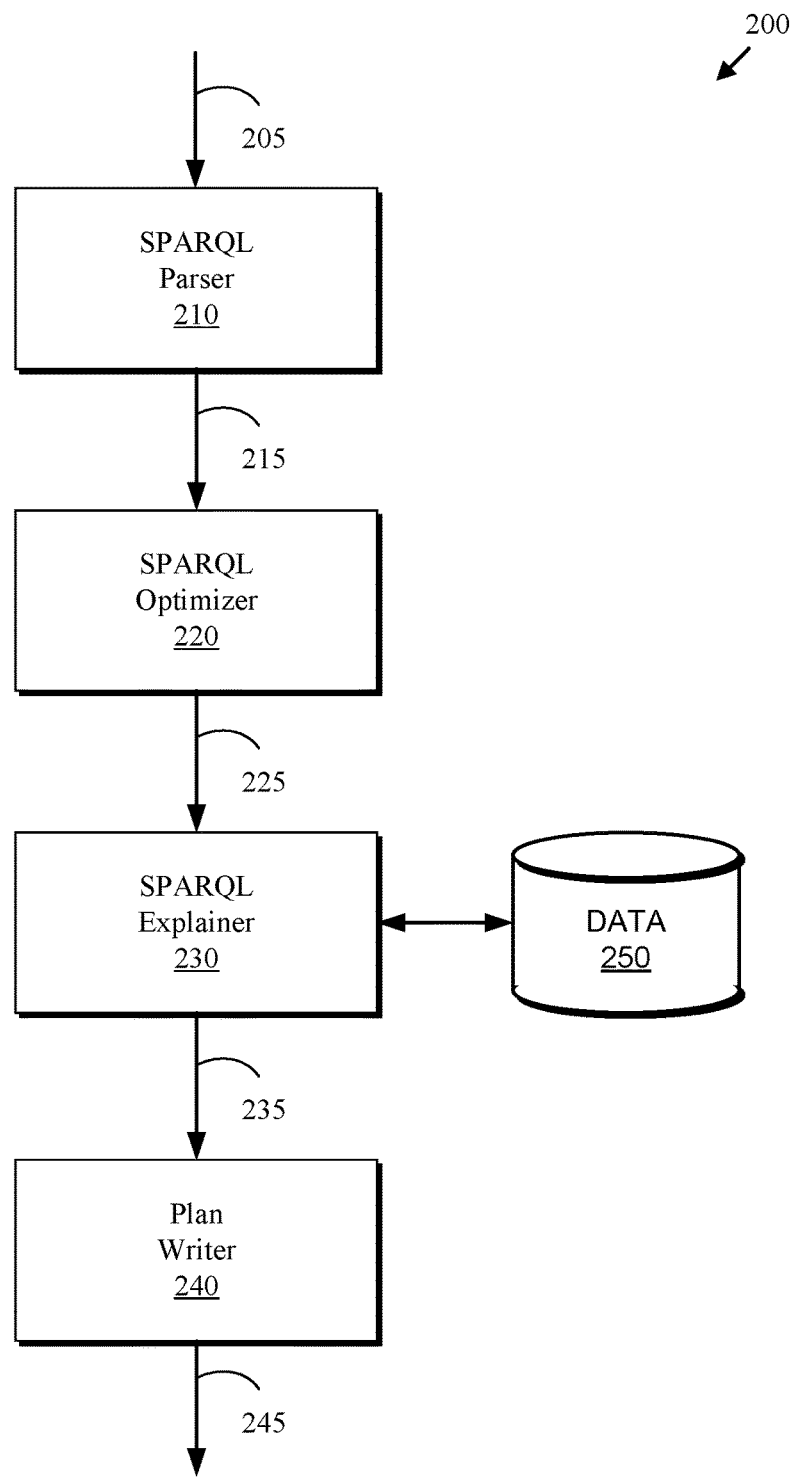
FIG. 2 is a data flow diagram depicting one embodiment of SPARQL query transformation, in accordance with the present invention.

FIG. 2 is a data flow diagram depicting one embodiment of SPARQL query transformation apparatus 200. As depicted, SPARQL query transformation apparatus 200 includes SPARQL parser 210, SPARQL optimizer 220, SPARQL explainer 230, plan writer 240, and data 250. The explain output produced from a transformed SPARQL query by apparatus 200 may be used to optimize the SPARQL query.

SPARQL parser 210 receives SPARQL query command 205. SPARQL parser 210 may be used to analyze a SPARQL query command, determine what is being requested by the SPARQL query command, and provides parsed SPARQL command 215. SPARQL parser 210 may detect a command or keyword indicating SPARQL explain output is to be produced. SPARQL optimizer 220 receives parsed SPARQL command 215. SPARQL optimizer 220 may optimize parsed SPARQL command 215, based on query semantics and metadata statistics retrieved from data 250, producing optimized query 225. Those of skill in the art will appreciate that various methods exist for ultimately determining and formulating the optimized query.

SPARQL explainer 230 may execute optimized query 225 using data 250 to retrieve information requested (i.e., selected) in the SPARQL query. SPARQL explainer 230 may reference data 250 to correlate the information produced by SPARQL optimizer 220 with the patterns of the SPARQL query, producing explain plan 235. In some embodiments, data source 120 of FIG. 1 may contain data 250. Plan writer 240 may arrange the data in explain plan 235 in a format that is able to be understood by one of skill in the art, producing explain output 245.

Figure 3:
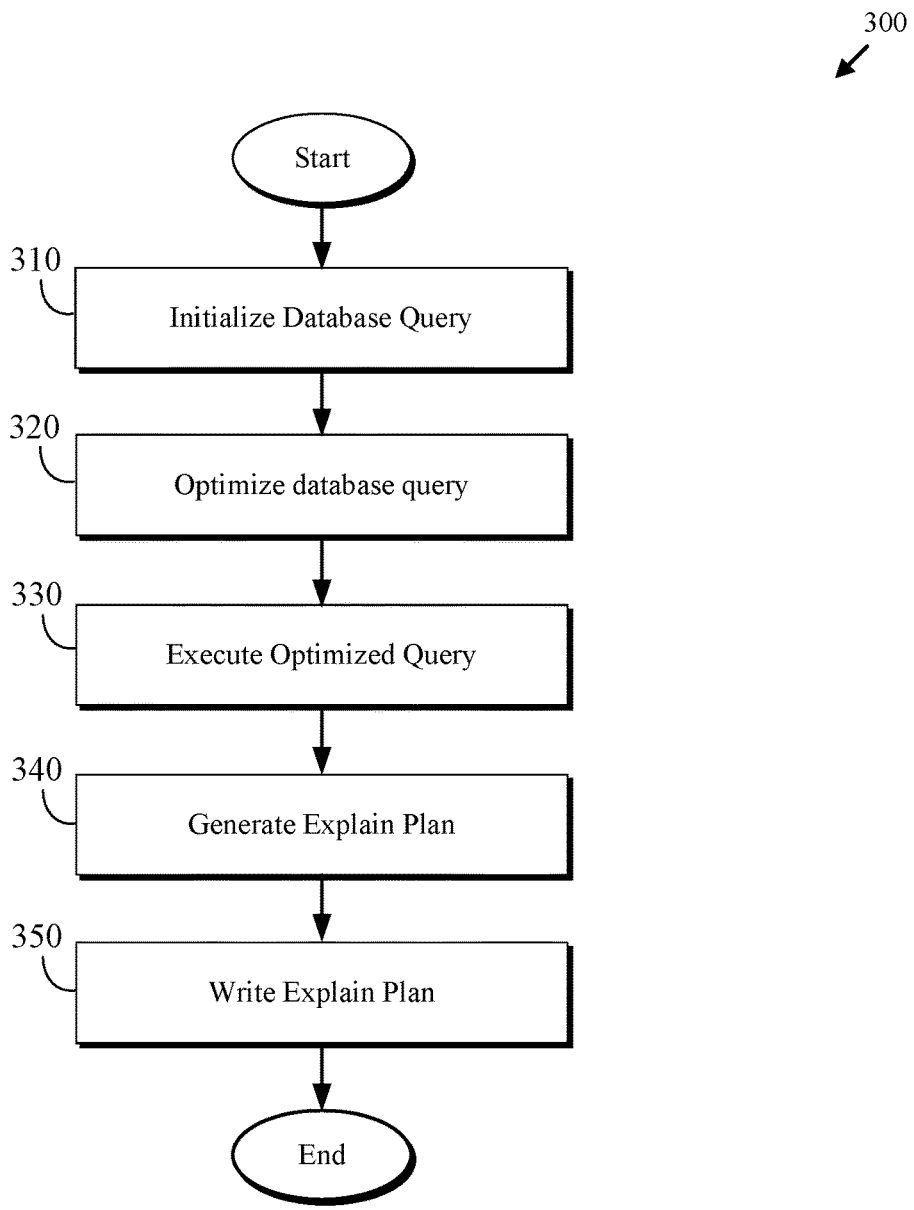
FIG. 3 is a flow chart depicting a SPARQL explain output generation method, in accordance with an embodiment of the present invention.

FIG. 3 is a flow chart depicting SPARQL explain output generation method 300. As depicted, SPARQL explain output generation method 300 includes initializing (310) a database query, optimizing (320) a database query, executing (330) an optimized query, generating (340) an explain plan, and writing (350) the explain plan. The SPARQL explain output generation method 300 may be used to produce an explain output which may enable the optimization of a SPARQL query.

Initializing (310) a database query may include initiating a SPARQL query command comprising a SPARQL query pattern. The SPARQL query command may be parsed to check for any syntactical errors. The parsing process may also produce warnings indicating the query is syntactically correct, but may contain a logic issue (e.g., a selected value that is never used). The parser may be a lexical and grammatical parser used to tokenize the query. Additionally, initializing (310) may also include verifying that the databases referenced in the query patterns are accessible.

Optimizing (320) a database query may include altering the order in which the SPARQL query patterns are processed, as well as placing filters to produce an optimized query. The query optimizer may discover more than one possible solution for resolving the request identified in the SPARQL query command. If more than one possible solution is discovered, an optimized query may be determined by examining and analyzing metadata corresponding to the query. In one embodiment, optimizing operation 320 is performed by SPARQL optimizer 220, as depicted in FIG. 2. In some embodiments, the optimized query is a SQL query.

Executing (330) an optimized query may include executing an optimized query produced by optimizing operation 320. The query may be comprised of a different query format and query language than the original SPARQL database query. The optimized query may be in a format that is not easily identifiable with any of the SPARQL query patterns corresponding to the SPARQL query command. In some embodiments, the SPARQL query patterns have been transformed into SQL queries. Execution of the optimized query may produce result sets that contain one or more records (e.g., rows) of data. In one embodiment, the result set is a final result of the SPARQL database query. In another embodiment, the result set is an intermediate result set which may be used as input to subsequent query activity, and the query command is still executing.

Generating (340) an explain plan may include retrieving information corresponding to a sequence of operations that are performed when the optimized query is executed. In one embodiment, generating (340) an explain plan includes SPARQL explainer 230 retrieving query execution statistics and information corresponding to the optimized query from data 250 (e.g., Data Sources 120). The query execution statistics may include execution details for all steps corresponding to the optimized query. Types of data and statistics gathered may include, but is not limited to, whether a database index was used for the step, whether the distinct attribute was applied to the step, the elapsed time for the step, and the number of rows returned by the step. Additionally, each step may be correlated to a pattern or an operation of the SPARQL query command, rather than the optimized query. Correlating execution statistics to a step in the explain plan may be implementation dependent. In one embodiment, queries are created using the common table expression feature (CTE) of DB2. For example, a CTE may exist for each step in the explain plan and gathering the execution statistics for a step includes executing a statement selecting all the projections for a given CTE.

Figure 4:
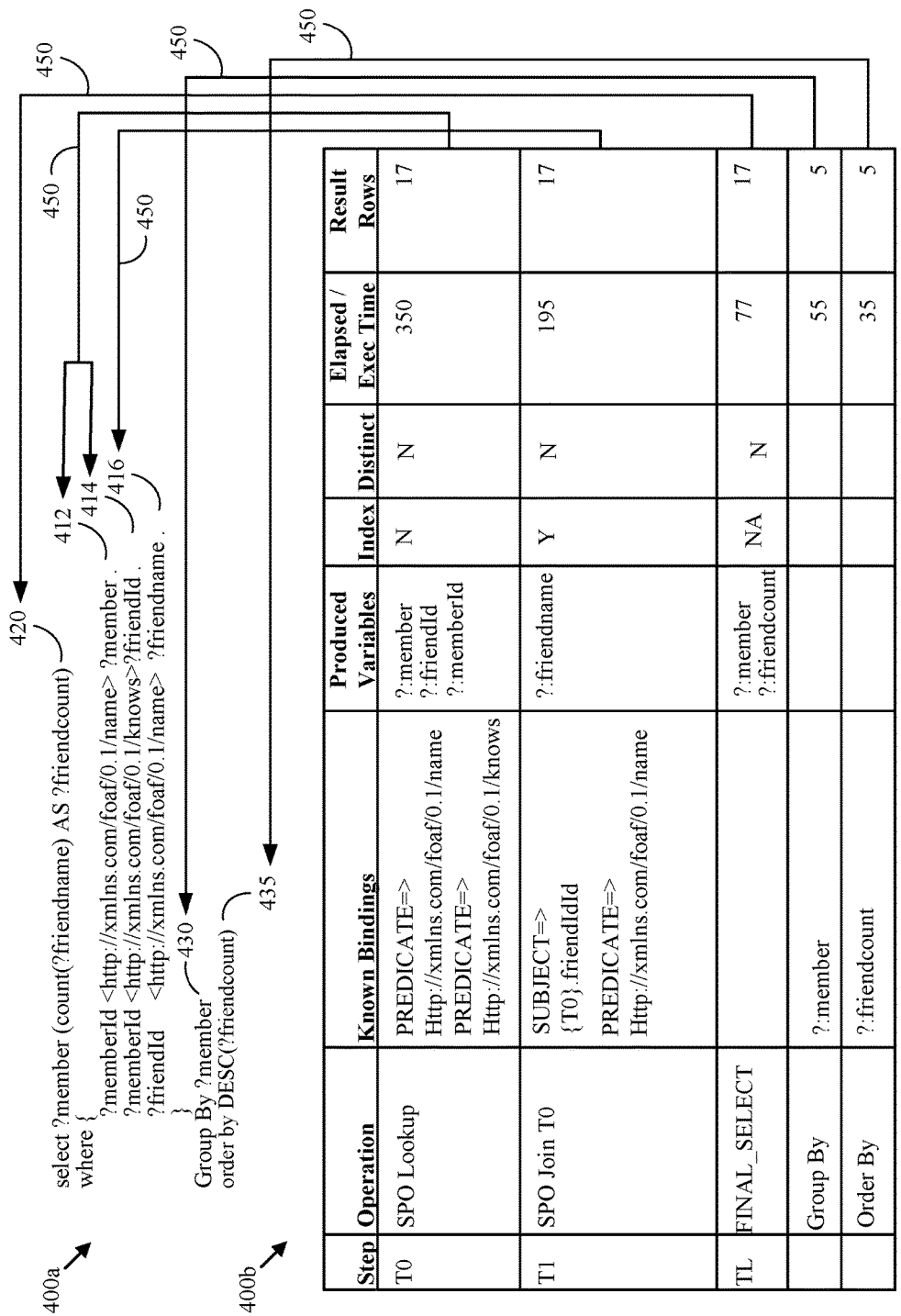
FIG. 4 is an example of a SPARQL query statement to retrieve information from a database and a SPARQL explain output produced when the SPARQL query statement is executed, in accordance with an embodiment of the present invention.

Writing (350) the explain plan may include producing explain output by formatting data from the explain plan into an intelligible format (e.g., explain output or an explain report) and presenting it to a user. Intelligible formats may include HTML, PDF, documents, spreadsheets, and text files. One example of an explain report, including a description of the content of the rows and columns, is depicted in FIG. 4. In one embodiment, writing operation 350 is performed by Plan writer 240 as depicted in FIG. 2. In some embodiments, the formatted report is a HTML report that is presented to the user on a computer monitor using a web browser. In other embodiments, the report is a PDF or any other intelligible format that is stored on persistent storage (i.e., persistent storage 508 of FIG. 5) for printing or analysis at a time convenient for the user.

FIG. 4 depicts one embodiment of an example of SPARQL query statement 400*a*, and one embodiment of an example of SPARQL explain output 400*b* corresponding to example SPARQL query statement 400*a*. When example SPARQL query statement 400*a* executes, it may generate example SPARQL explain output 400*b*. Example SPARQL explain output 400*b* may be used to analyze the query execution statistics corresponding to example SPARQL query statement 400*a*.

The function (i.e., expected output) of example SPARQL query statement 400*a* is, for each member of a community, determine how many other members of the community the first member knows, and order the result by the descending count of the number of friends. As depicted, example SPARQL query statement 400*a* includes three SPARQL query patterns (i.e., 412, 414, and 416). SPARQL query pattern 412 requests all the memberIds and the member name corresponding to each memberId in a community. SPARQL query pattern 414 determines who knows whom in the community. SPARQL query pattern 416 determines the name of the member whose id is represented by the friendId variable of 414.

Example SPARQL explain output 400*b* is a formatted report containing information and query execution statistics corresponding to example SPARQL query statement 400*a*. Example SPARQL explain output 400*b* comprises rows and columns. Each row corresponds to a portion of the example SPARQL query statement 400*a* and includes columns. 'Step' is an identifier corresponding to a row in the report and any operations that occurred during the step. 'Operation' identifies the database operation that was performed (e.g., SPO lookup, OPS lookup, Union, SPO Join, and OPS Join). 'Known bindings' identifies the variables in the step that have known values, such as SPARQL constants or variables evaluated in a previous step. 'Produced variables' identifies variables evaluated in the current step. 'Index' provides an index indicator denoting whether an index was used when evaluating the current step. 'Distinct' provides a distinct keyword indicator denoting whether the distinct keyword was used when evaluating the current step. 'Elapsed/exec time' displays, in milliseconds, the total execution time required for the current step. If the current step is dependent on other steps, the time displayed may be the total elapsed time for all dependent steps. 'Result rows' indicates the number of rows returned by the current step (i.e., row cardinality of the current step).

SPARQL query patterns (i.e., 412, 414, and 416) identified in example SPARQL query statement 400*a* may be represented in the report. Correlation lines 450 identify the correlation between lines in example SPARQL query statement 400*a* and rows in example SPARQL explain output 400*b*. The row of the report identified by step T0 represents SPARQL query patterns 412 and 414, and the operations performed on them. The row of the report identified by step T1 represents SPARQL query pattern 416, and the operations performed on it. The row of the report identified by step TL (i.e., line 420) represents the select portion of the SPARQL query. The final two rows of the report, not identified by step identifiers present statistics corresponding to the group by (430) and the order by (435) directives, producing the grouping and ordering identified in example SPARQL query statement 400*a*.

When reviewing example SPARQL explain output 400*b*, a user may that observe one or more known bindings and one or more produced variables for a step correspond to a specific SPARQL query pattern. In the depicted example, the row identified by step T0 corresponds to the first two SPARQL query patterns 412 and 414. The user may observe this correspondence by noticing that the reference <http://xmlns.com/foaf/0.1/name> is used in SPARQL query pattern 412 and is a known binding for step T0. Similarly, the reference <http://xmlns.com/foaf/0.1/name> is used in SPARQL query pattern 414 and is also a known binding for step T0. Furthermore, the row identified by step T0 contains three produced variables which correspond to the produced variables in SPARQL query patterns 412 and 414 (i.e., ?:member, ?:friendId, and ?:memberId). Similarly, a user can observe that the row identified by step T1 corresponds to SPARQL query pattern 416 in that the reference <http://xmlns.com/foaf/0.1/name> is a known binding for step T1 and ?:friendname is a produced variable for step T1.

A user may notice that step T0 is requiring more execution time than other steps. A user may also observe that the index column of the row corresponding to step T0 indicates that no index is used. The observations may indicate the performance of step T0 may be improved if indexes are added for this step, resulting in improved performance for the entire query. The user may also notice that step T1 is retrieving values for variable friendname, but friendname is never used after it is resolved. The performance of the example SPARQL query statement 400*a* may be improved if the pattern 416 is removed from the example SPARQL query statement 400*a*.

FIG. 5 depicts a block diagram of components of a computer system 500, which is an example of a system such as 110 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Data processor 110 includes processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., data 250 and SPARQL explain output generation method 300, are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of data processor 110. In these examples, communications unit 510 includes one or more network interface cards. Communications unit 510 may provide communications through the use of either or both physical and wireless communications links. Program instructions and data used to practice embodiments of data 250 and SPARQL explain output generation method 300 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, executed by a computer, for enabling a SPARQL explain tool which provides query execution statistics via an explain plan, the method comprising:
   initiating a database query comprising a SPARQL query pattern to query data from a resource description framework ("RDF") Triplestore database, where SPARQL query language is used because data is stored in a RDF Triplestore database, and where the data in the RDF Triplestore database is represented by triples;

optimizing the database query according to query semantics and database metadata to produce an optimized query, including altering an order in which the SPARQL query pattern is processed;

executing the optimized query in the RDF Triplestore;

generating a SPARQL explain plan from the optimized query, wherein the SPARQL explain plan produces an explain output that enable further optimization of the optimized query, and wherein the SPARQL explain plan is a formatted report given in SPARQL query language including query execution statistics; and determining, based on using the SPARQL explain plan to identify one or more issues with execution of the optimized query, performance improvements for the optimized query.

2. The method of claim 1, wherein at least a portion of the explain plan is presented to a user.

3. The method of claim 1, wherein the explain plan further comprises a row cardinality for each operation of a sequence of operations of the query execution statistics.

4. The method of claim 1, wherein the explain plan comprises one or more known bindings and one or more produced variables for a step that correspond to the SPARQL query pattern.

5. The method of claim 1, wherein the explain plan further comprises a distinct keyword indicator for each operation of a sequence of operations of the query execution statistics.

* * * * *